(12) United States Patent
Kimizuka et al.

(10) Patent No.: US 7,992,928 B2
(45) Date of Patent: Aug. 9, 2011

(54) VEHICLE ROOF STRUCTURE

(75) Inventors: Akiyuki Kimizuka, Toyota (JP); Hitoshi Yasuda, Nagoya (JP); Shinji Hirai, Toyota (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 0 days.

(21) Appl. No.: 12/594,680

(22) PCT Filed: Feb. 5, 2008

(86) PCT No.: PCT/JP2008/051830
§ 371 (c)(1),
(2), (4) Date: Oct. 5, 2009

(87) PCT Pub. No.: WO2008/126456
PCT Pub. Date: Oct. 23, 2008

(65) Prior Publication Data
US 2010/0117405 A1    May 13, 2010

(30) Foreign Application Priority Data

Apr. 6, 2007 (JP) .................... 2007-100643

(51) Int. Cl.
*B60P 7/00* (2006.01)
(52) U.S. Cl. ........................ 296/214; 362/490
(58) Field of Classification Search .............. 296/214; 160/238–326; 362/490
See application file for complete search history.

(56) References Cited

U.S. PATENT DOCUMENTS
2009/0072574 A1    3/2009 Tominaga et al.

FOREIGN PATENT DOCUMENTS

| EP | 1234720 | * | 2/2002 |
|---|---|---|---|
| JP | 61-107618 | | 7/1986 |
| JP | 3-14746 | | 1/1991 |
| JP | 2006-35945 | | 2/2006 |
| JP | 2006-290026 | | 10/2006 |
| JP | 2007-131208 | | 5/2007 |

OTHER PUBLICATIONS

English language translation ( Claim and Fig. 1-Fig. 5) of JP 61-107618, Jul. 8, 1986.
English language Abstract of JP 3-14746, Jan. 23, 1991.
English language Abstract of JP 2006-290026, Oct. 26, 2006.
English language Abstract of JP 2007-131208, May 31, 2007.
English language Abstract of JP 2006-35945, Feb. 9, 2006.

* cited by examiner

*Primary Examiner* — Dennis Pedder
(74) *Attorney, Agent, or Firm* — Greenblum & Bernstein, P.L.C.

(57) ABSTRACT

A vehicle roof structure which can regulate the quantity of lighting while ensuring appearance quality when viewed from the compartment. When a roll shade is arranged at a retreat position, incident light penetrates a glass roof thence penetrates a supporting member and a closing member exhibiting translucency and finally penetrates an opaque skin material exhibiting translucency. Since the opaque skin material covers a ceiling matrix on the inside of the compartment and closes the ceiling opening continuously from the inside of the compartment, if a roll shade is arranged at the light shielding position, the ceiling opening cannot be distinguished easily by a crewman when the crewman looks the vehicle roof side from the inside of the compartment and it is recognized as continuous interior.

4 Claims, 10 Drawing Sheets

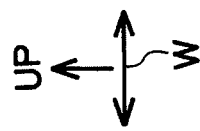
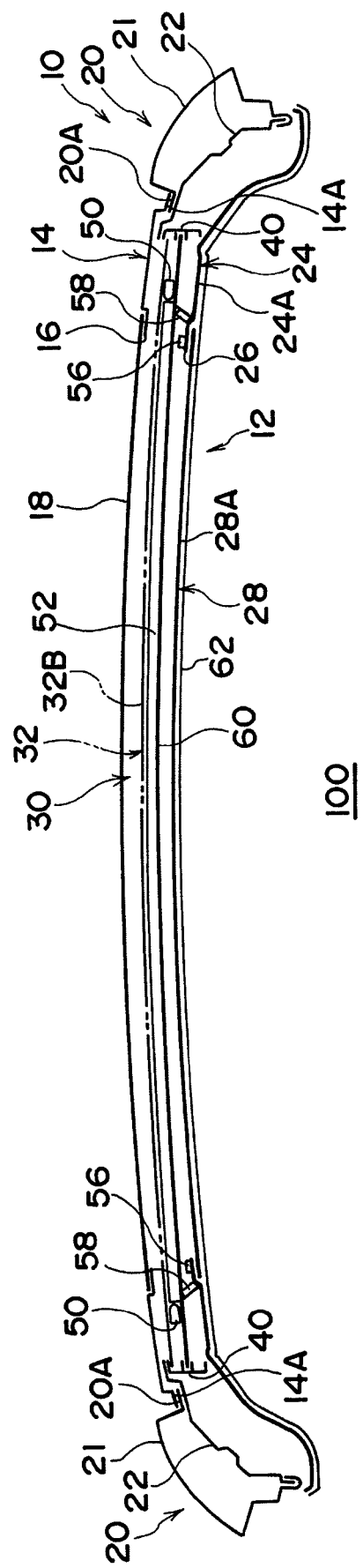

VEHICLE ROOF STRUCTURE

TECHNICAL FIELD

The present invention relates to a vehicle roof structure which may letting in light from an opening of a roof panel.

BACKGROUND ART

In a vehicle roof, in order to adjust an amount of daylight from an opening to allow light to enter formed on a roof panel, a light shielding plate which may open and close the opening is arranged (for example, see Patent Document 1). In such a structure, for example, the opening to allow light to enter is formed so as to pierce a part of a head liner corresponding to a lower side of the roof, and a light transmitting plate is fitted into the opening so as to be fixed.

In this conventional structure, however, due to a difference in appearance between the head liner and the light transmitting plate, a sense of unity viewed from the vehicle compartment is deteriorated even at the time of shielding light using the light shielding plate, and thus its appearance quality is deteriorated.

Patent Document 1: Japanese Patent Application Laid-Open No. 2006-35945

DISCLOSURE OF THE INVENTION

Problem to be Solved by the Invention

A problem of the present invention is to provide a vehicle roof structure which may adjust a daylight amount and may secure appearance quality viewed from a vehicle compartment in consideration of the above facts.

Means to Solve the Problem

A vehicle roof structure of claim 1 has: a roof panel formed with a first opening to allow light to enter; a ceiling base material which is arranged on an inner side of a vehicle compartment with respect to the roof panel and is formed with a second opening including at least a part of a portion on the inside of the vehicle compartment that faces the first opening; a light shielding member which is arranged on the inner side of the vehicle compartment with respect to the roof panel and on an upper side with respect to the ceiling base material, which is used for shielding incident light from the first opening into the vehicle compartment, and is movable between a light shielding position where the incident light is shielded and a retreat position where it is retreated from the light shielding position; and an opaque skin material having a light transmitting property which covers the ceiling base material on the inside of the vehicle compartment and seals the second opening on the inside of the vehicle compartment; and a light transmitting blocking member which is arranged to be aligned with a surface portion of the ceiling base material on the inside of the vehicle compartment without a difference in level therebetween in a roof verticle direction, and which blocks up the second opening, the blocking material being covered with the skin material on the inside of the vehicle compartment.

In the vehicle roof structure, the light shielding member is movable between the light shielding position where incident light from the first opening into the vehicle compartment is shielded and the retreat position retreated from the light shielding position. When the light shielding member is arranged on the retreat position, the incident light from the first opening of the roof panel passes through the blocking member having the light transmitting property at the second opening of the ceiling base material and further transmits through the opaque skin material having the light transmitting property. On the other hand, when the light shielding member is arranged on the light shielding position, the incident light from the first opening of the roof panel into the vehicle compartment is shielded by the light shielding member. Since the opaque skin material covers the ceiling base material on the inside of the vehicle compartment and seals the second opening on the side of the vehicle compartment, the light transmitting blocking member is arranged to be aligned with the surface portion of the ceiling base material on the inside of the vehicle compartment without a difference in level therebetween and blocks up the second opening, and the skin material covers the blocking member on the inside of the vehicle compartment, a portion of the skin material continues from a portion of the skin material at the second opening on the inside of the vehicle compartment, along the blocking member, to a portion of the ceiling base material on the inside of the vehicle compartment without there being a difference in level therebetween. Due to this, a vehicle occupant who views the roof in the vehicle compartment hardly makes out the second opening and thus recognizes it as a continuous interior.

In the vehicle roof structure of claim 1: the light shielding member is a light shielding sheet formed into a sheet shape, and the vehicle roof structure comprises: a winding section to which one end of the light shielding sheet is attached and which winds the light shielding sheet at the retreat position so as to be capable of being pulled out; and a light transmitting supporting member which is arranged along a movement path of the light shielding sheet and supports a surface portion of the light shielding sheet that faces the inside of the vehicle compartment when at least a part of the light shielding sheet is pulled out from the winding section.

In the vehicle roof structure, the light shielding sheet is wound at the retreat position by the winding section so as to be capable of being pulled out, so that the light shielding member is stored more compactly than a comparable structure in which a board-shaped light shielding member is stored on the retreat position. Further, since the supporting member arranged along the moving trajectory of the light shielding sheet has the light transmitting property, the incident light from the first opening of the roof panel transmits through the supporting member so as to enter the vehicle compartment via the second opening of the ceiling base material and the skin material. Since the surface portion of the light shielding sheet facing the vehicle compartment is supported by the light transmitting supporting member in the state where at least a part of the light shielding sheet is pulled out from the winding section, looseness of the light shielding sheet is suppressed. Therefore, unevenness of a light shielding line and shadows due to the looseness of the light shielding sheet may be suppressed.

A vehicle roof structure has: a light transmitting member which is arranged at the first opening; and a light emitting section which is arranged on the inner side of the vehicle compartment with respect to the roof panel and on the upper side with respect to the ceiling base material, which can emit light to at least one of the roof panel side or the light transmitting member side, and is used for indirect illumination of the vehicle compartment.

In the vehicle roof structure, since the light emitting section for the indirect illumination to the vehicle compartment, which is arranged on the inner side of the vehicle compartment with respect to the roof panel and on the upper side of the ceiling base material, may emit light to at least one of the roof panel side and the light transmitting member side, when the light emitting section emits light in a state where the light shielding member is arranged on the retreat position at night, for example, the light is reflected from at least one of the roof panel side and the light transmitting member side, so as to pass through the second opening of the ceiling base material and transmit through the opaque skin material having the light transmitting property.

In a vehicle roof structure, a light source which can emit illumination light to the vehicle compartment is attached to a front end portion of a light shielding area that moves when the light shielding member moves between the light shielding position and the retreat position.

In the vehicle roof structure, since the light source attached to the front end portion of the light shielding area in the light shielding member may emit the illumination light to the vehicle compartment, when the light source emits illumination light to the vehicle compartment at night, for example, a moving position of the illumination light (in other words, the position of front end portion of the light shielding member) is understood by the vehicle occupant in the vehicle compartment at the time when the light shielding member moves between the light shielding position and the retreat position.

EFFECT OF THE INVENTION

As described above, the vehicle roof structure of claim 1 according to the present invention has an excellent effect such that an amount of daylight may be adjusted, generation of the looseness and the level difference on the portion of the skin material at the second opening on the inside of the vehicle compartment is suppressed, and the appearance quality viewed from the vehicle compartment may be secured.

The vehicle roof structure has an excellent effect such that the space may be saved and the disorder and shade of light shielding line caused by the looseness of the light shielding sheet (light shielding member) at the time of winding and pulling-out may be suppressed.

The vehicle roof structure has an excellent effect such that light may be let in from an upper side of skin material at night when the outside of the vehicle is dark.

The vehicle roof structure has an excellent effect such that the light may be let in from the skin material on the upper side at night during which the outside of the vehicle is dark and the position of the light shielding member may be understood.

BRIEF DESCRIPTION OF THE DRAWINGS

FIG. 5 is an enlarged cross-sectional view illustrating a section taken along line 5-5 of FIG. 2;

BEST MODE FOR CARRYING OUT THE INVENTION

Structure of Exemplary Embodiment

A vehicle roof structure according to an exemplary embodiment of the present invention is described with reference to FIGS. 1 to 10. An arrow UP suitably shown in these drawings shows an upper side of a vehicle, an arrow FR shows a front side of the vehicle, and an arrow W shows a widthwise direction of the vehicle. In the exemplary embodiment, the upper side of the vehicle and an upper side of a roof are the same as each other.

Figure 1:
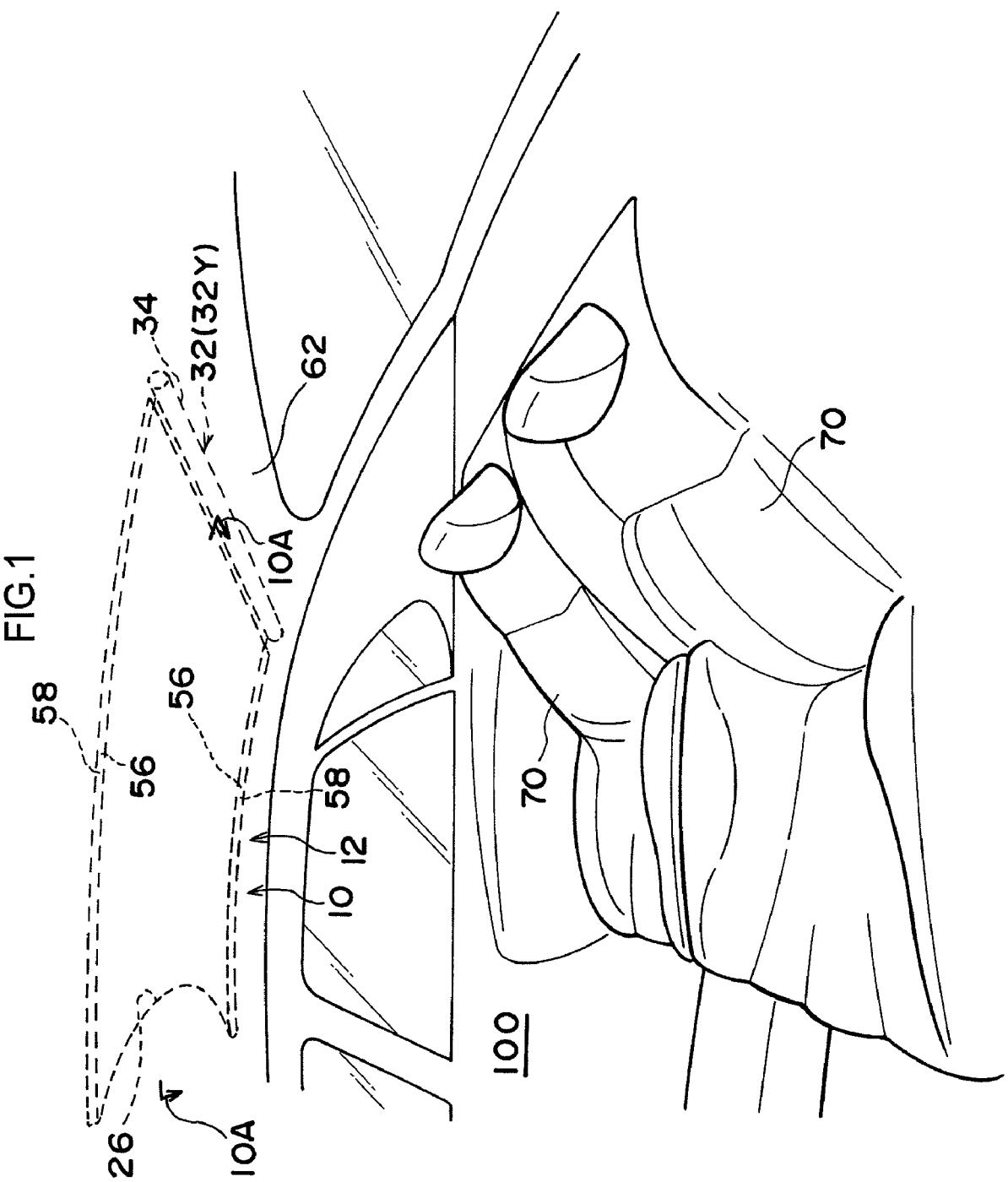
FIG. 1 is a perspective view illustrating an appearance in a vehicle compartment of a vehicle adopting a vehicle roof structure according to an exemplary embodiment of the invention, and a state in which a roll shade is on a retreat position is shown by a hidden line.
Figure 2:
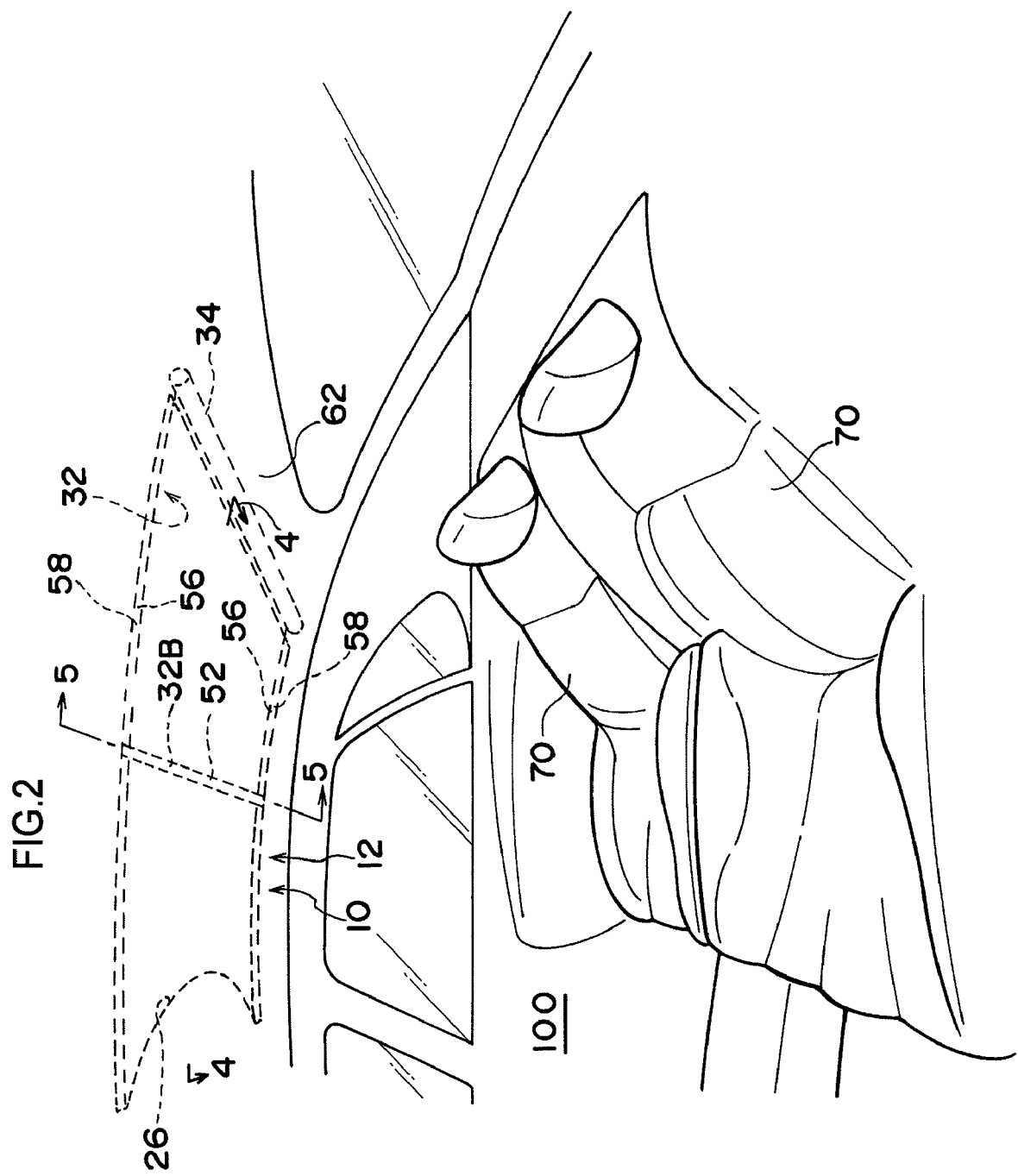
FIG. 2 is a perspective view illustrating the appearance in the vehicle compartment of the vehicle adopting the vehicle roof structure according to the exemplary embodiment of the invention, and a state in which the roll shade is on a middle position between the retreat position and a light shielding position is shown by a hidden line.
Figure 3:
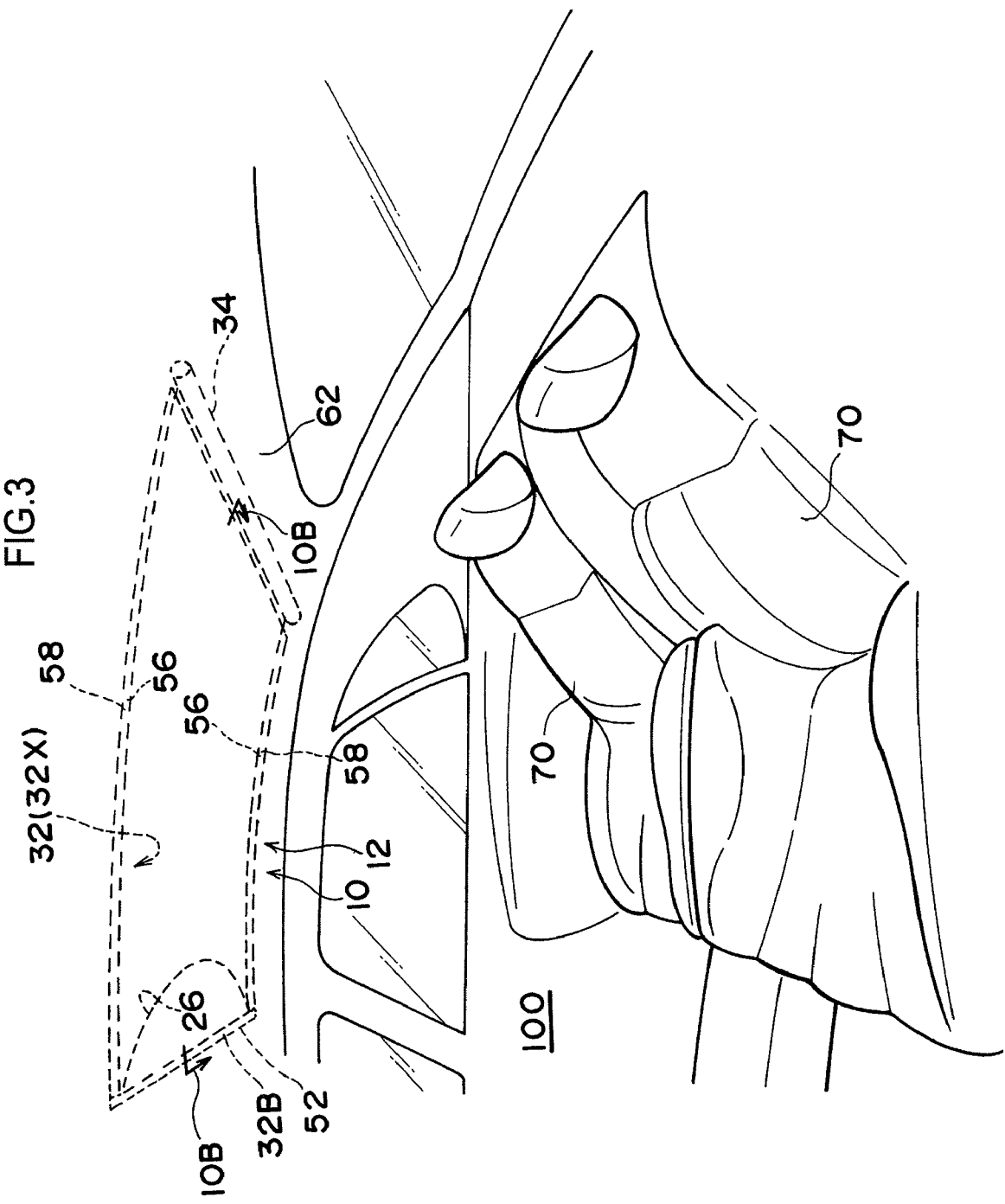
FIG. 3 is a perspective view illustrating the appearance in the vehicle compartment of the vehicle adopting the vehicle roof structure according to the exemplary embodiment of the invention, and a state in which the roll shade is on the light shielding position is shown by a hidden line.
Figure 4:
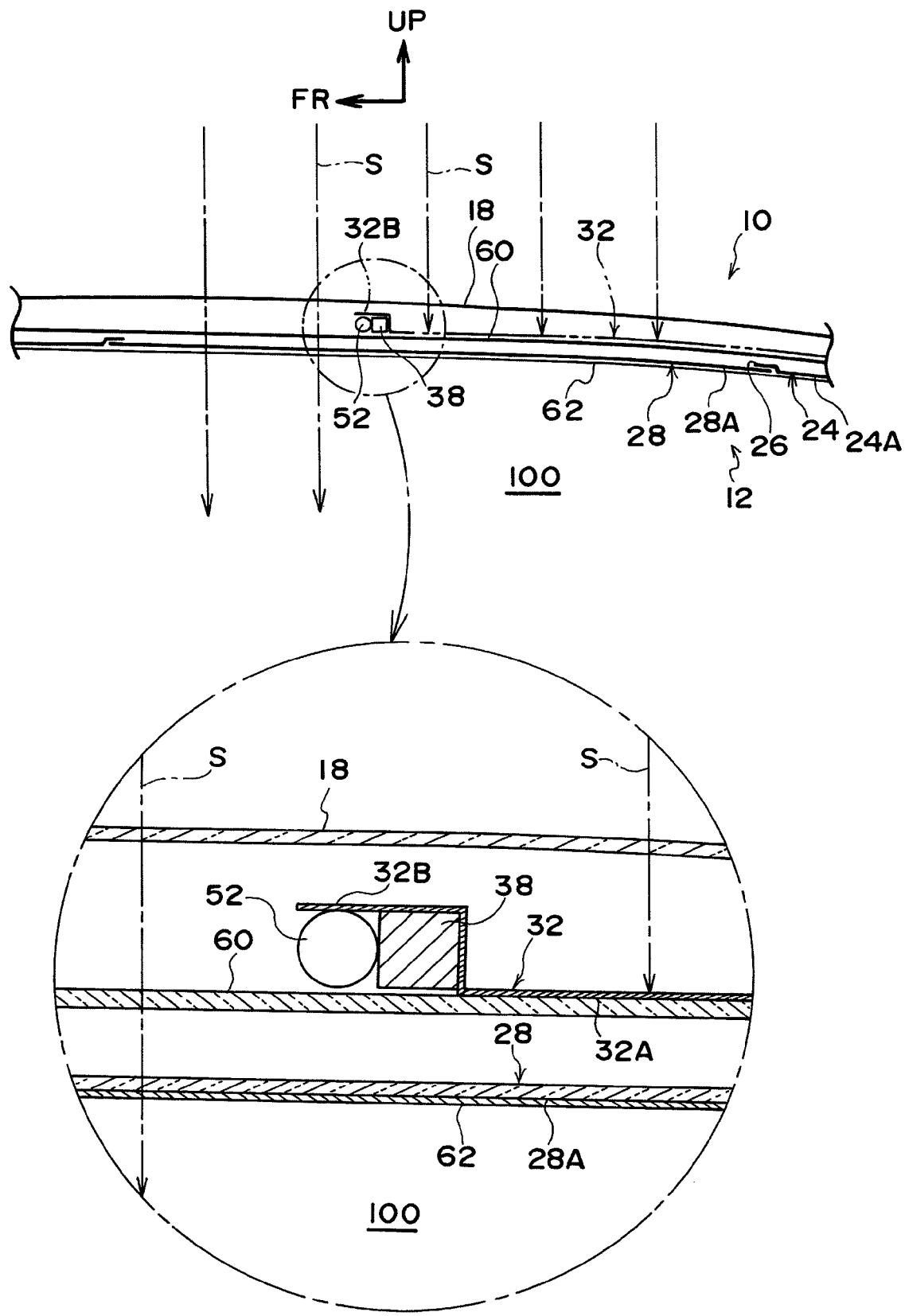
FIG. 4 is an enlarged cross-sectional view illustrating a section taken along line 4-4 of FIG. 2.

FIGS. 1 to 3 illustrate an appearance of a vehicle compartment. As shown in these drawings, a vehicle upper portion 10 is provided with a vehicle roof (daylight roof) 12 which may adjust an amount of daylight by means of a vehicle occupant's operation, and the vehicle roof 12 has a roll shade 32 (detailed later) as a light shielding sheet (light shielding member) which may be opened and closed. FIG. 4 is an enlarged cross-sectional view illustrating a section taken along line 4-4 of FIG. 2, and FIG. 5 is an enlarged cross-sectional view illustrating a section taken along line 5-5 of FIG. 2, namely, a state where the vehicle roof 12 adopting the vehicle roof structure according to the invention is cut along the vehicle widthwise direction.

As shown in FIG. 5, a roof panel 14 as a vehicle panel of a roof main body is disposed on an outermost portion of the vehicle roof 12 of an upper end portion of a vehicle compartment 100, and a roof opening 16 as a first opening to allow light to enter is formed on the roof panel 14, and a glass roof (also referred to as an outside glass) 18 as a light transmitting member made of glass is fixed by fitting the same to the roof opening 16. A roof side rail 20 is disposed along a vehicle front-rear direction on both sides of the roof panel 14. The roof side rail 20 is formed into a closed cross-sectional structure by a roof side rail outer panel 21 and a roof side rail inner panel 22, and an end portion 14A (a terminal portion) of the roof panel 14 on an outer side in the vehicle widthwise direction is jointed to a flange portion 20A positioned on an inner side in the vehicle widthwise direction by spot welding.

Figure 6:
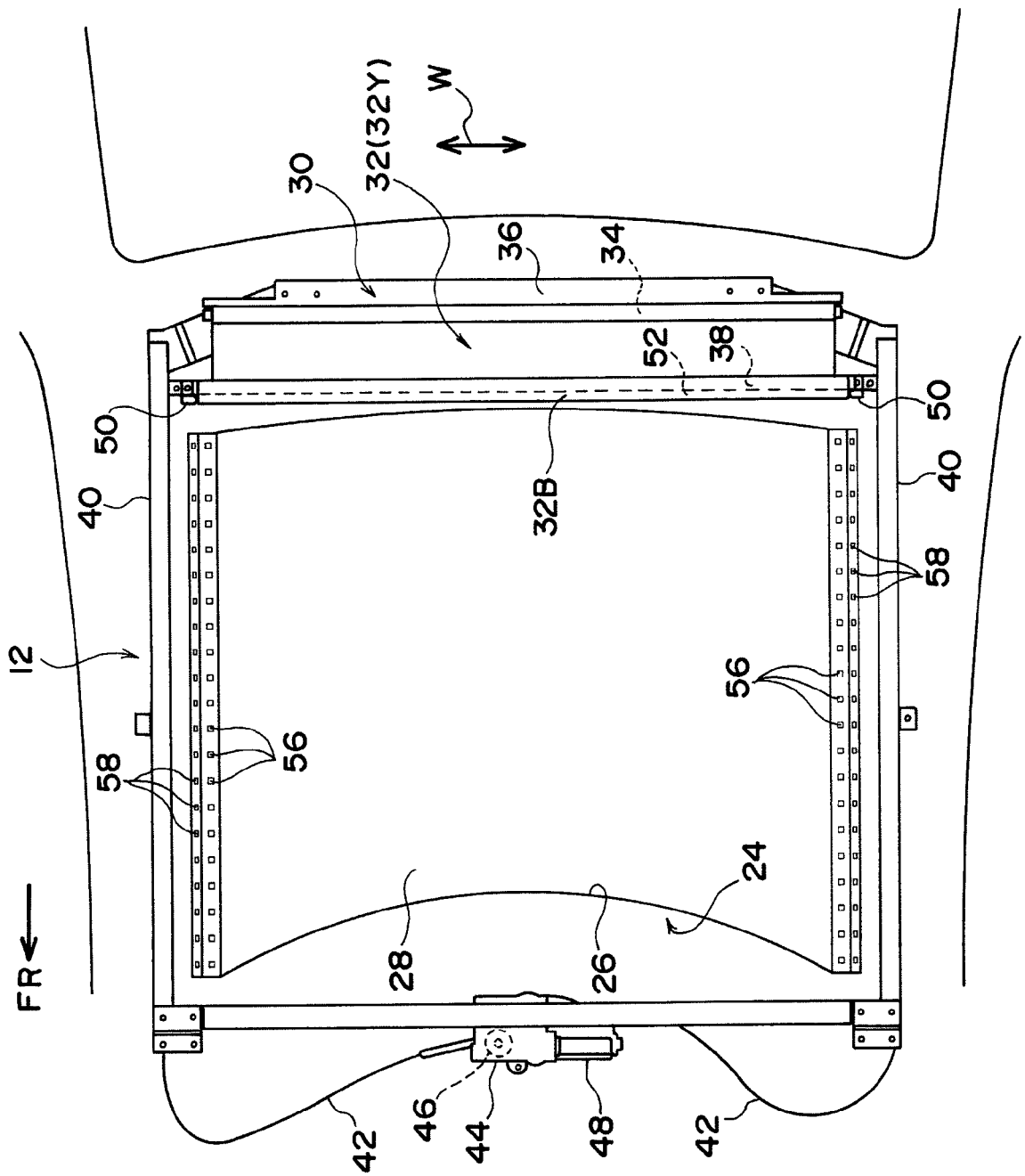
FIG. 6 is a plan view illustrating a ceiling base material or the like according to the exemplary embodiment of the invention.

A ceiling base material 24 is arranged on a ceiling interior side which is on an inner side of the vehicle compartment 100 with respect to the roof panel 14 so as to be approximately parallel with the roof panel 14. The ceiling base material 24 is made of, for example, a foamed molded product or the like formed by a fiber molded product or hard urethane, extends to near the vehicle lower side of the roof side rail 20 in the vehicle widthwise direction, and extends to near the vehicle lower sides of a roof front cross member and a roof rear cross member, not shown, in the vehicle front-rear direction. A ceiling opening 26 as a second opening is formed in the ceiling base material 24 so as to include at least a part of a portion inside the vehicle compartment that opposes the roof opening 16. As shown in a plan view of FIG. 6 illustrating the ceiling base material 24 or the like, the ceiling opening 26 is formed into an approximately rectangular shape. The ceiling opening 26 in the exemplary embodiment is formed so that a line on the vehicle front side has a concave arc shape from a viewpoint of a design, however, the line on the vehicle front side may be linear. As shown in FIG. 5, a light transmitting blocking member 28 is fixed to the ceiling opening 26 by fitting. The blocking member 28 is a frosted glass-type plate member (acrylic board) made of acrylic resin having a light transmitting property in the exemplary embodiment, and a surface portion 28A on the inside of the vehicle compartment 100 is arranged so as to be aligned with the surface portion 24A of the ceiling base material 24 on the inside of the vehicle compartment 100 without a difference in level therebetween in a roof vertical direction, and the ceiling blocking material 28 blocks up the ceiling opening 26.

Plural LEDs (light-emitting diodes) 56 and 58 as light emitting sections for indirect illumination to the vehicle compartment 100 (see FIG. 5) are arranged on both sides of the ceiling opening 26 in the vehicle widthwise direction shown in FIG. 6 on the inner side of the vehicle compartment 100 with respect to the roof panel 14 and on the upper side with respect to the ceiling base material 24 so as to be along the vehicle front-rear direction. As shown in FIG. 5, the LED 56 arranged near an edge portion of the ceiling opening 26 is set so as to emit light towards an approximately roof upper side, namely, a roof panel 14 side, and the LED 58 arranged on the outer side in the vehicle widthwise direction with respect to the LED 56 is set so as to emit light upwards towards the roof in a direction inclined towards the inside in the vehicle widthwise direction towards the side of the glass roof 18.

A roll shade 32 which is formed into a sheet shape is arranged on the inner side of the vehicle compartment 100 with respect to the roof panel 14 and on the upper side with respect to the ceiling base material 24. The roll shade 32 is made of a light shielding material (for example, a resin sheet or a fabric having a light shielding property), is used for shielding incident light from the roof opening 16 to the inside of the vehicle compartment 100, and movable between a light shielding position 32X shown in FIG. 10B where incident light S (a dot-dash arrow) is shielded and a retreat position 32Y shown in FIG. 10A retreated from the light shielding position 32X where the incident light S is not shielded. The roll shade 32 is formed thinner than a board type shade, thereby providing added-value setting such as indirect illumination of the LEDs 56 and 58 shown in FIG. 5.

Figure 7:
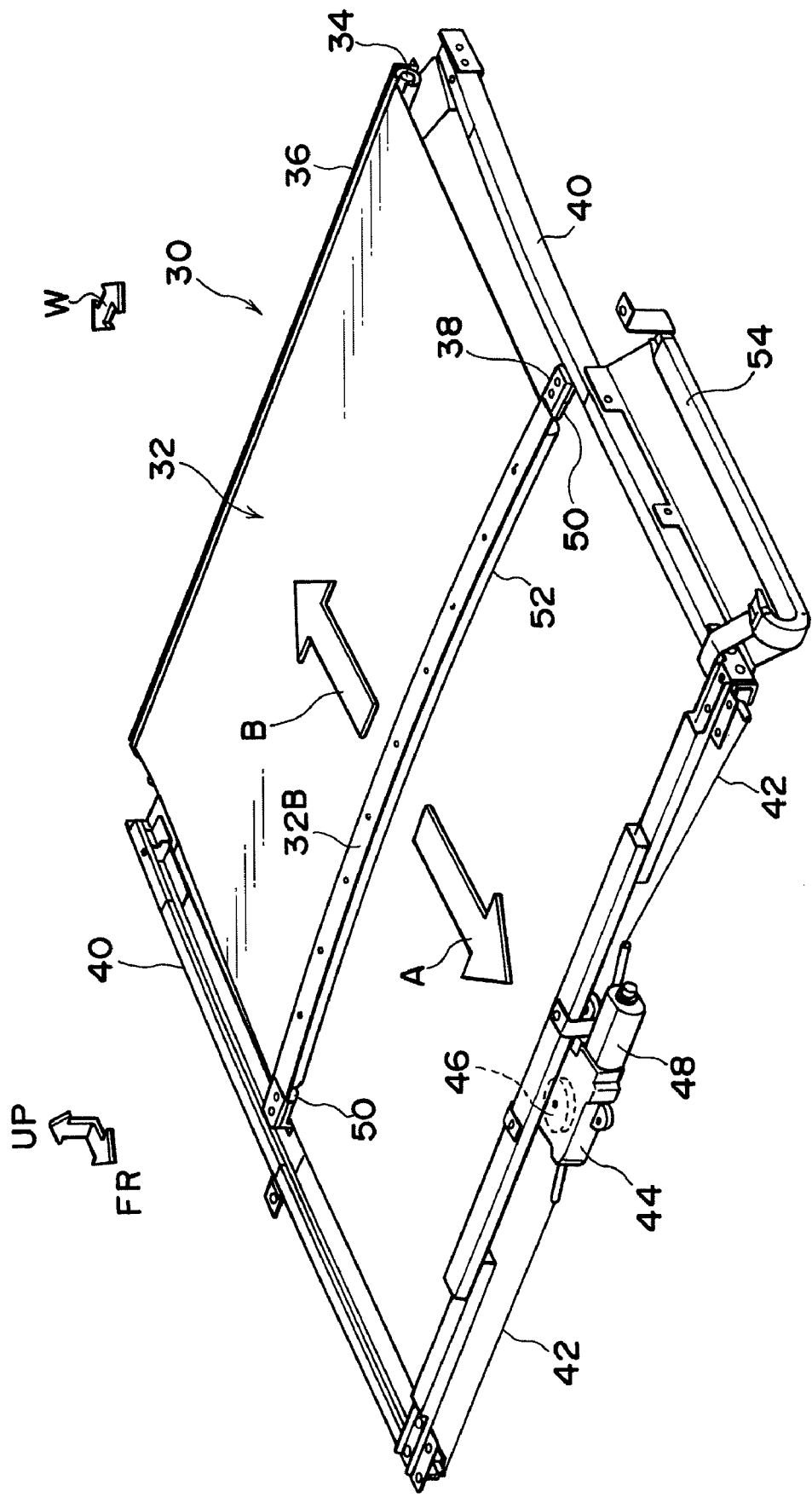
FIG. 7 is a perspective view illustrating a shading apparatus of the vehicle roof structure according to the exemplary embodiment of the invention, and illustrates a state in which the roll shade is at an intermediate position between the retreat position and the light shielding position.

FIG. 7 is a perspective view illustrating a shading apparatus 30 having the roll shade 32. The shading apparatus 30 is fixed to roof side rails 20 (see FIG. 5) or the like, and has a function for arranging the roll shade 32 to a predetermined set position through an operation. As shown in FIG. 7, one end of the roll shade 32 is attached to a roll shade winding section 34. The roll shade winding section 34 is constituted so that one end of the roll shade 32 is biased to a winding direction by an biasing member (not shown), and the roll shade 32 is wound at the retreat position 32Y (see FIG. 8) so as to be pulled out. In FIG. 7, a moving direction of a front end portion 32B of the roll shade 32 at the time of winding the roll shade 32 is shown by an arrow B. The roll shade winding section 34 is arranged in a housing 36 whose vehicle widthwise direction is a longitudinal direction. The housing 36 is formed into an approximately C shape so that a shape of a cross section thereof perpendicular to the longitudinal direction is opened in a slit shape towards the approximately vehicle front side, and the roll shade 32 may be pulled out from and inserted into the slit-shaped opening.

A movable bar 38 made of metal is fixed to a lower surface of the front end portion 32B of the roll shade 32 with the vehicle widthwise direction being set as the longitudinal direction (see FIG. 4). As shown in FIG. 5, both end portions of the movable bar 38 in the longitudinal direction are inserted into approximately U-shaped guide rails 40 opened to an inner side in the vehicle widthwise direction viewed from a cross section. As shown in FIG. 7, the pair of the right and left guide rails 40 is arranged parallel with each other with an approximately vehicle front-rear direction being set as the longitudinal direction, and specifies the moving direction of the movable bar 38. Further, a wire 42 is connected to both end portions of the movable bar 38 in the longitudinal direction. The wire 42 extends to the vehicle front side along the guide rails 40, and is wound around a pulley 46 in a case 44 provided to the front end portion of the shading apparatus 30. The pulley 46 is connected to a motor 48, and in a state in which the pulley 46 rotates in a normal direction, the wire 42 pulls out the movable bar 38 (and thereby, the front end portion 32B of the roll shade 32) in a pulling-out direction (direction of the arrow A) towards the approximately vehicle front side against a winding force of the roll shade winding section 34 by means of a driving force of the motor 48.

Further, LED (light-emitting diode) 50 as a light source is fixed to the end portions of the movable bar 38 in the longitudinal direction on the vehicle front side, an electric wiring (not shown), is connected to the LED 50, and a light guiding tube 52 as a light source whose vehicle widthwise direction is the longitudinal direction is connected to the LED 50. A separated housing member 54 is fixed to a portion of the guide rails 40 on the vehicle front side portion, and the housing member 54 houses a part of the electric wiring (not shown), loosening at the time of moving the movable bar 38. The light guiding tube 52 is fixed to the movable bar 38 on the vehicle front side, and guides light from the LED 50 to the vehicle widthwise direction. The LED 50 and the light guiding tube 52 as the light sources which may emit illumination light into the vehicle compartment 100 (see FIG. 5) are mounted to the front end portion 32B of a light shielding area which fluctuates at the time when the roll shade 32 moves between the light shielding position 32X (see FIG. 9) and the retreat position 32Y (see FIG. 8). That is to say, the LED 50 and the light guiding tube 52 fixed to the movable bar 38 as well as the LEDs 56 and 58 on both sides of the ceiling opening 26 in the vehicle widthwise direction shown in FIG. 5 serve as intermediate portion illumination in the vehicle roof 12.

As shown in FIG. 4, a light transmitting supporting member 60 is arranged on the inner side of the vehicle compartment 100 with respect to the roll shade 32 along the moving trajectory of the roll shade 32. The supporting member 60 is a plate-shaped member (acrylic plate) made of acrylic resin and is used for supporting the roll shade 32, and supports a surface portion 32A of the roll shade 32 facing the inside of the vehicle compartment 100 in a state in which at least a part of the roll shade 32 is pulled out from the roll shade winding section 34 (see FIG. 7).

As shown in FIG. 5, the vehicle compartment 100 side of the ceiling base material 24 and the vehicle compartment 100 side of the blocking member 28 are covered with one (same) skin material 61 which continuously extends. In other words, the skin material 62 is adhered to the ceiling base material 24 and the blocking member 28 so as to form a design surface, and blocks up the ceiling opening 26 on the inside of the vehicle compartment 100. The skin material 62 to be an interior material is opaque and has a light transmitting property, and more concretely is made of unwoven fabric obtained by joining fibers (for example, polypropylene fibers) into a cloth with a thickness of several mm using an adhesive such as synthetic resin or the like in the exemplary embodiment, and a lot of fabric gaps (not shown) which may allow light to transmit are formed. The light transmitting property (light transmittance) of the skin material 62 is set to, for example, 30% to 80%. For this reason, the skin material 62 improves tactual sense and a sound absorbing and insulating property, and allows the incident light S (see FIG. 4) from the outside such as solar light and light from the LEDs 56, 58 and 50 and the light guiding tube 52 into the vehicle compartment 100 to transmit therethrough.

The skin material 62 has the light transmitting property and may allow light to transmit therethrough, however, since it is opaque (in other words, the other side of the position at which it is arranged is not seen or is hardly seen depending on the arrangement), the ceiling opening 26 is almost never visually recognized by the vehicle occupant in the vehicle compartment 100 when the skin material 62 does not allow light to transmit from the upper side of the roof into the vehicle compartment 100. In the exemplary embodiment, in addition to the arrangement of the skin material 62, since a frost glass type acrylic plate is used as the blocking member 28 as described above, the mechanism or the like of the shading apparatus 30 may be effectively hidden, and thus even if the roll shade 32 loosens, for example, such a loosened portion may be hidden.

Function and Effect of the Exemplary Embodiment

A function and an effect of the exemplary embodiment are described below.

Figure 10A:
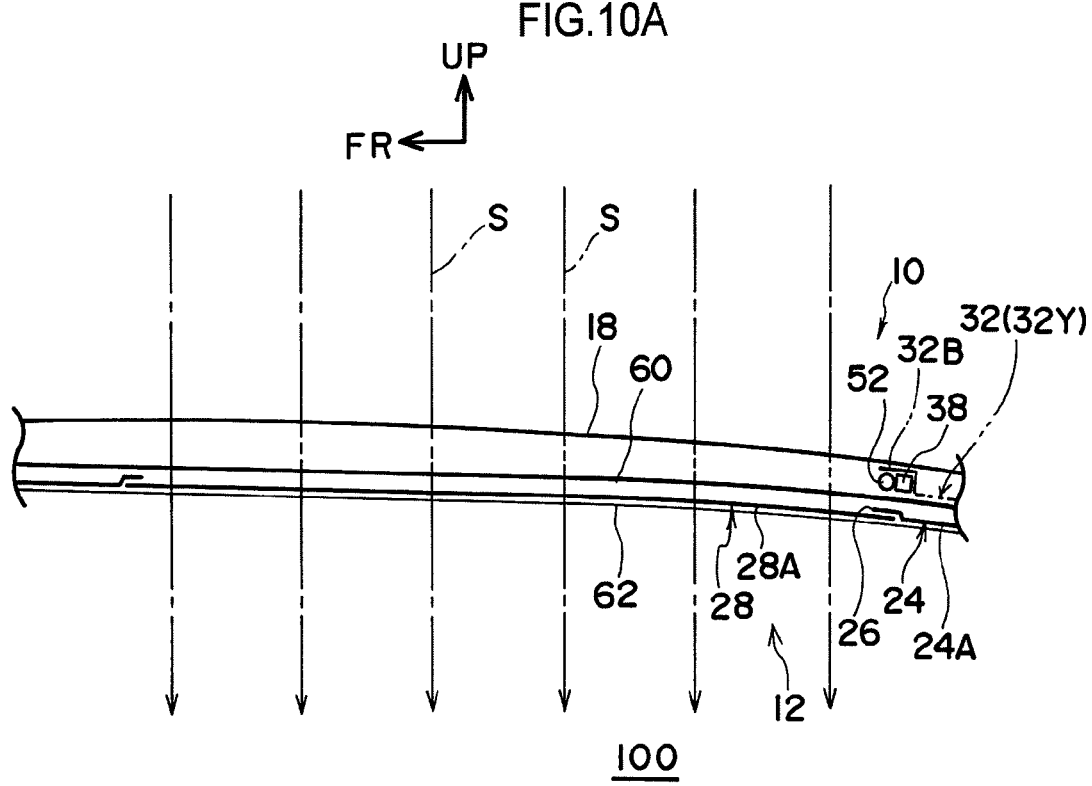
FIG. 10A is a cross-sectional view illustrating the roll shade of the vehicle roof structure according to the exemplary embodiment of the invention in a state in which the roll shade is at the retreat position (fully-opened state), and corresponds to an enlarged cross section taken along line 10A-10A of FIG. 1.
Figure 10B:
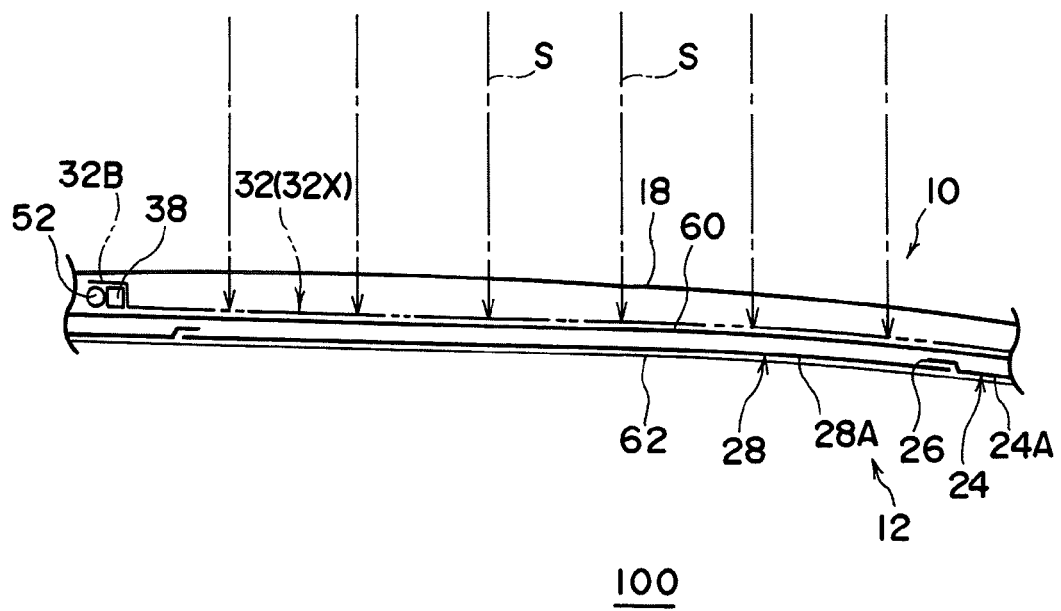
FIG. 10B is a cross-sectional view illustrating a state in which the roll shade of the vehicle roof structure according to the exemplary embodiment of the invention is on the light shielding position (fully-closed state), and corresponds to an enlarged cross section taken along line 10B-10B of FIG. 3.

As shown in FIGS. 10A and 10B, the roll shade 32 moves between the light shielding position 32X (see FIG. 10B) where the incident light S from the glass roof 18 (roof opening 16 (see FIG. 5)) into the vehicle compartment 100 is shielded and the retreat position 32Y (see FIG. 10A) retreated from the light shielding position 32X by means of a vehicle occupant's predetermined operation.

Figure 8:
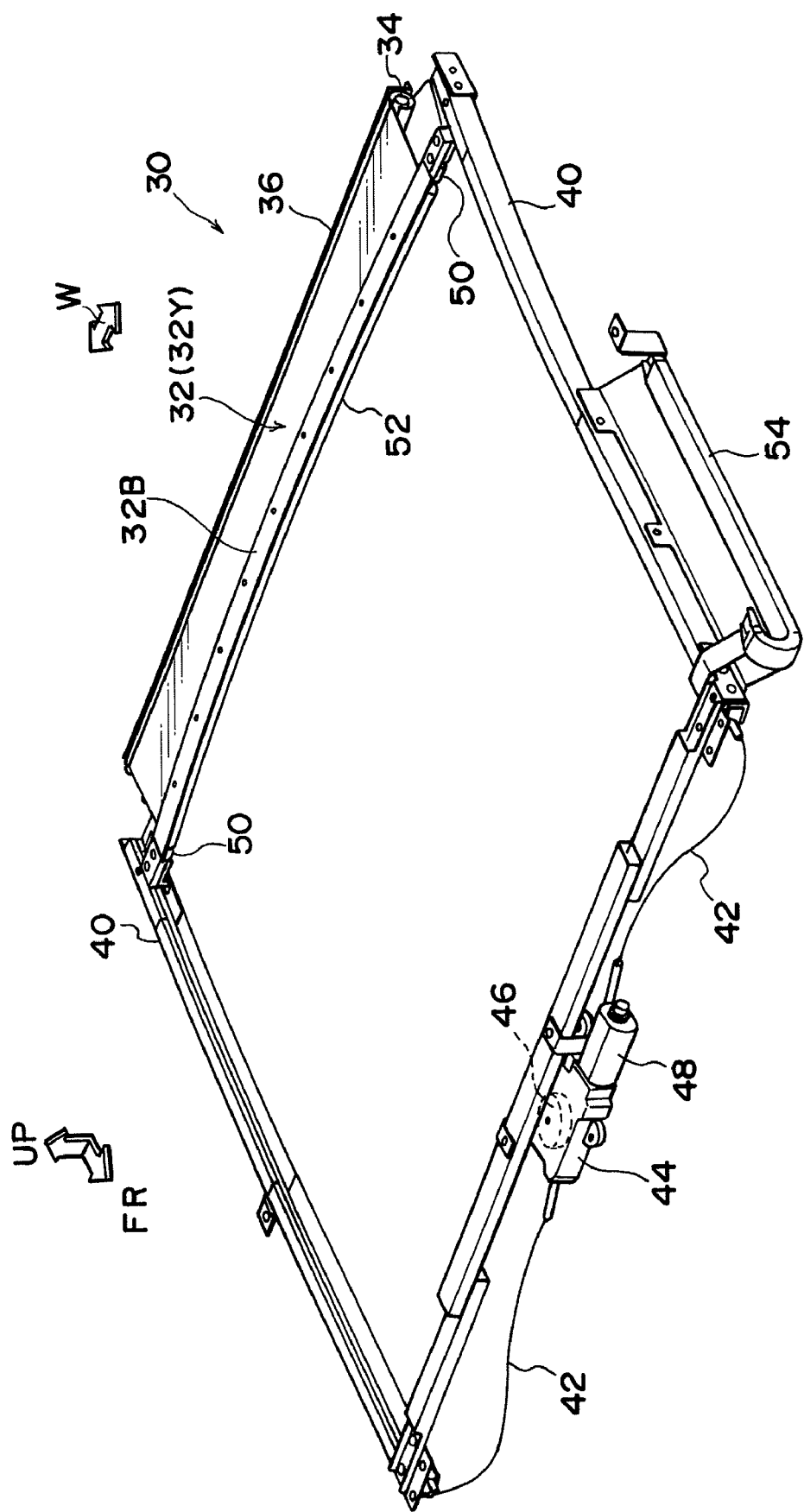
FIG. 8 is a perspective view illustrating the shading apparatus of the vehicle roof structure according to the exemplary embodiment of the invention, and illustrates a state in which the roll shade is on the retreat position.

When the vehicle occupant performs a predetermined retreating operation, the roll shade 32 shown in FIG. 8 is wound around at the retreat position 32Y so as to be pulled out by the roll shade winding section 34, and is housed more compactly, for example, than a comparable structure in which a board type shade is housed in the retreat position. In addition, when the light shielding member is the board type shade like the comparable structure, a limit of a ceiling height in the vehicle compartment becomes large in order to house the thick shade and a plane dimension in a shade housed state is large, so that a large housing space is necessary. When the space above a vehicle occupant's head is set small due to such restriction and necessity, the vehicle occupant on the rear seat feel a pressure inconveniently. However, when the roll shade 32 as the light shielding member is wound around at the roll shade winding section 34 like the exemplary embodiment, the space for the storage portion of the light shielding member may be saved, and the disadvantage of the comparable structure may be solved, so that a head clearance is easily secured.

As shown in FIGS. 1 and 10A, when the roll shade 32 is arranged on the retreat position 32Y so as to be in the full-opened state, the incident light S such as sunlight from upper side of the roof shown in FIG. 10A transmits through the glass roof 18 via the roof opening 16 (see FIG. 5), then through the supporting member 60 having the light transmitting property, and transmits through the blocking member 28 having the light transmitting property via the ceiling opening 26, and finally transmits through the opaque skin material 62 having the light transmitting property. As a result, since the incident light S enters into the vehicle compartment 100, an impression of an open space may be provided to an occupancy space of the vehicle occupant on a rear seat 70 shown in FIG. 1.

Figure 9:
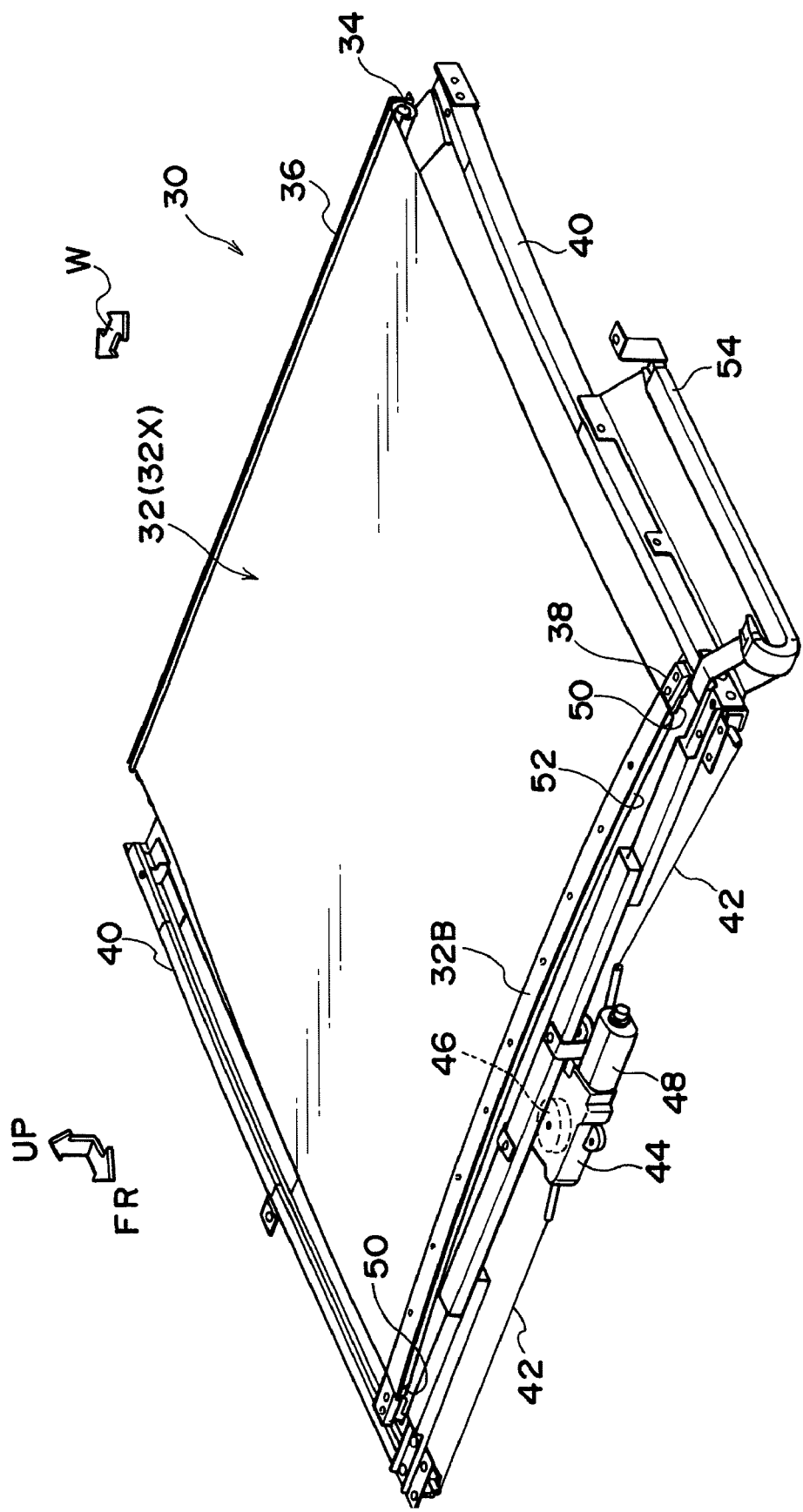
FIG. 9 is a perspective view illustrating the shading apparatus of the vehicle roof structure according to the exemplary embodiment of the invention, and illustrates a state in which the roll shade is on the light shielding position.

On the other hand, when the vehicle occupant performs a predetermined pulling-out operation, the motor 48 shown in FIG. 7 is driven to rotate in a normal direction so as to rotate the pulley 46 normally, and thus the wire 42 is wound around the pulley 46 so that, as shown in FIG. 9, the wire 42 pulls out the movable bar 38 (finally, the front end portion 32B of the roll shade 32) to the approximately vehicle front side against the winding force of the roll shade winding section 34. When the roll shade 32 shown in FIGS. 3 and 10B is arranged on the light shielding position 32X so as to be in the full-closed state, namely, at the time of using the roll shade 32, as shown in FIG. 10B, the incident light S from the glass roof 18 (roof opening 16 (see FIG. 5)) to the vehicle compartment 100 is shielded by the roll shade 32.

Since the opaque skin material 62 covers the vehicle compartment 100 side of the ceiling base material 24 and continuously seals the ceiling opening 26 on the inside of the vehicle compartment 100, the vehicle occupant in the vehicle compartment 100 who views the vehicle roof 12 hardly see the ceiling opening 26 and recognizes it as the continuous interior. The skin material 62 thus continuously forms the interior of the vehicle compartment 100 in the vehicle roof 12, so that a private space may be provided to the rear seat 70 shown in FIG. 3.

Particularly as shown in FIG. 10B, since the blocking member 28 is arranged to be aligned with the surface portion 24A of the ceiling base material 24 on the inside of the vehicle compartment 100 without a difference in level therebetween in a roof vertical direction, blocks up the ceiling opening 26 and the skin material 62 covers the blocking member 28 on the inside of the vehicle compartment 100 in a stuck manner, the skin material 62 continues with the portion of the ceiling base material 24 on the inside of the vehicle compartment 100 without a difference in level therebetween so that the portion of the ceiling opening 26 on the inside of the vehicle compartment 100 is along the blocking member 28, so that generation of looseness and a difference in level in the skin material 62 on the inside of the vehicle compartment 100 at the portion of the ceiling opening 26 can be suppressed, and the appearance quality viewed from the vehicle compartment 100 may be satisfactory.

As shown in FIG. 4, in a state in which at least a part of the roll shade 32 is pulled out from the roll shade winding section 34 (see FIG. 7), since the light transmitting supporting member 60 supports the surface portion 32A of the roll shade 32 facing the inside of the vehicle compartment 100, the looseness of the roll shade 32 at the time of the winding and the pulling-out is suppressed. Therefore, the generation of the disorder and the shade of the light shielding line due to the looseness of the roll shade 32 may be suppressed.

As shown in FIG. 5, the LEDs 56 and 58 for the indirect illumination of the vehicle compartment 100, which are arranged on the inner side of the vehicle compartment 100 with respect to the roof panel 14 and on the upper side of the ceiling base material 24, may emit light towards the roof panel 14 and the glass roof 18. For this reason, when the LEDs 56 and 58 are allowed to emit light in the state in which the roll shade 32 is arranged on the retreat position 32Y (see FIG. 10A) at night (the opened state), for example, the light is reflected from the supporting member 60, the glass roof 18, and the roof panel 14 so as to transmit through the blocking member 28 at the ceiling opening 26 of the ceiling base material 24 and further transmits through the opaque skin material 62 having the light transmitting property. When the LEDs 56 and 58 are used as the indirect illumination in such a manner (a state in which indirect light is used), light may enter from the roof upper side of the skin material 62 also at night when the outside of the vehicle is dark, so that the vehicle occupant in the vehicle compartment 100 is imparted with a feeling of depth, namely, that the space above the vehicle occupant's head is wider (illumination effect).

Further, the LED 50 and the light guiding tube 52 mounted to the front end portion 32B of the roll shade 32 in the light shielding area shown in FIGS. 4 and 5 may emit illumination light to the vehicle compartment 100. For this reason, in the case where the LED 50 emits light at night so that the light is guided in the vehicle widthwise direction by the light guiding tube 52, and the LED 50 and the light guiding tube 52 emit illumination light to the vehicle compartment 100, when the roll shade 32 shown in FIGS. 10A and 10B moves between the light shielding position 32X (see FIG. 10B) and the retreat position 32Y (see FIG. 10A), as shown in FIG. 2, the vehicle occupant in the vehicle compartment 100 can be aware of the moving position of the illumination light, in other words, the position of the front end portion 32B of the roll shade 32. As a result, light may be let in from the roof side of the skin material 62 at night where the outside of the vehicle is dark, and the position of the roll shade 32 can be understood, and an effect of moving illumination is imparted.

As described above, in the vehicle roof structure according to the exemplary embodiment, an amount of daylight may be adjusted, and the appearance quality viewed from the vehicle compartment 100 may be secured.

Supplemental Explanation of the Exemplary Embodiment

In the above exemplary embodiment, the skin material 62 shown in FIG. 4 or the like is made of unwoven fabric, and a lot of fiber gaps through which light may transmit are formed, however, the skin material may be another opaque skin material having the light transmitting property, such as woven cloth formed with a lot of mesh-shaped and light transmittable gaps (fine holes), or a resin material formed with a group of light transmitting portions including a large number of light transmittable and fine light transmitting portions.

In the above exemplary embodiment, the blocking member 28 is aligned with the surface portion 24A of the ceiling base material 24 on the inside of the vehicle compartment 100 without a difference in level therebetween in the roof vertical direction, and which blocks up the ceiling opening 26, and the blocking material 28 is covered with the skin material 62 on the inside of the vehicle compartment 100, and such a structure is preferable. However, the blocking member or the like does not have to be fixed to the second opening formed on the ceiling base material.

In the above exemplary embodiment, although the light shielding member is set as the roll shade 32 which is the light shielding sheet, the light shielding member may be a different light shielding member movable between the light shielding position where incident light is shielded and the retreat position retreated from the light shielding position, such as a board-shaped light shielding board movable to an advancing-retreating direction, or an accordion light shielding cloth which is developable to the light shielding position.

In the exemplary embodiment, the blocking member 28 and the supporting member 60 are made of acrylic resin, however, the blocking member and the supporting member may be formed from other materials having the light transmitting property such as polycarbonate resin. Further, in the structure that the blocking member is arranged, the supporting member may be made of glass, for example. In the exemplary embodiment, the light transmitting member is the glass roof 18 made of glass, however, similarly the light transmitting member may be formed by another material such as fiber-reinforced resin having the light transmitting property.

Entire disclosure of Japanese Patent Application No. 2007-100643 is incorporated herein by reference.

Explanation of Letters or Numerals

12: vehicle roof
14: roof panel
16: roof opening (first opening)
18: glass roof (light transmitting member)
24: ceiling base material
24A: surface portion of ceiling base material on the inside of vehicle compartment
26: ceiling opening (second opening)
28: blocking member
32: roll shade (light shielding sheet (light shielding member))
32A: surface portion of roll shade facing the inside of vehicle compartment (surface portion of light shielding sheet facing the inside of vehicle compartment)
32B: front end portion
32X: light shielding position
32Y: retreat position
34: roll shade winding section (winding section)
50: LED (light source)
52: light guiding tube (light source)
56: LED (light emitting section)
58: LED (light emitting section)
60: supporting member
62: skin material
100: vehicle compartment
S: incident light

The invention claimed is:
1. A vehicle roof structure comprising:
a roof panel formed with a first opening to allow light to enter;
a ceiling base material which is arranged on an inner side of a vehicle compartment with respect to the roof panel and is formed with a second opening including at least a part of a portion on the inner side of the vehicle compartment that faces the first opening;
a light shielding sheet which is arranged on the inner side of the vehicle compartment with respect to the roof panel and on an upper side with respect to the ceiling base material, which is used for shielding incident light from the first opening into the vehicle compartment, and is movable between a light shielding position where the incident light is shielded and a retreat position where it is retreated from the light shielding position;

an opaque skin material having a light transmitting property which covers the ceiling base material on the inner side of the vehicle compartment and seals the second opening on the inner side of the vehicle compartment;

a light transmitting blocking member which is arranged to be aligned with a surface portion of the ceiling base material on the inner side of the vehicle compartment without a difference in level therebetween in a roof vertical direction, and which blocks up the second opening, the light transmitting blocking material being covered with the opaque skin material on the inner side of the vehicle compartment;

a winding section to which one end of the light shielding sheet is attached and which winds the light shielding sheet at the retreat position so as to be capable of being pulled out; and a light transmitting supporting member which is arranged along a movement path of the light shielding sheet and supports a surface portion of the light shielding sheet that faces the inner side of the vehicle compartment when at least a part of the light shielding sheet is pulled out from the winding section.

2. The vehicle roof structure of claim 1, wherein a light source which can emit illumination light to the vehicle compartment is attached to a front end portion of a light shielding area that moves when the light shielding sheet moves between the light shielding position and the retreat position.

3. The vehicle roof structure of claim 1, comprising:
   a light transmitting member which is arranged at the first opening; and
   a light emitting section which is arranged on the inner side of the vehicle compartment with respect to the roof panel and on the upper side with respect to the ceiling base material, which can emit light to at least one of a roof panel side or a light transmitting member side, and is used for indirect illumination of the vehicle compartment.

4. The vehicle roof structure of claim 1, wherein a light source which can emit illumination light to the vehicle compartment is attached to a front end portion of a light shielding area that moves when the light shielding sheet moves between the light shielding position and the retreat position.

* * * * *